US010072480B2

United States Patent
Carroll et al.

(10) Patent No.: US 10,072,480 B2
(45) Date of Patent: Sep. 11, 2018

(54) DOWNHOLE POWER GENERATION SYSTEM

(71) Applicant: Halliburton Energy Services, Inc., Houston, TX (US)

(72) Inventors: Sean Carroll, Spring, TX (US); Andrew Downing, Bakersfield, CA (US)

(73) Assignee: Halliburton Energy Services, Inc., Houston, TX (US)

( * ) Notice: Subject to any disclaimer, the term of this patent is extended or adjusted under 35 U.S.C. 154(b) by 251 days.

(21) Appl. No.: 14/891,919

(22) PCT Filed: Jun. 17, 2013

(86) PCT No.: PCT/US2013/046073
§ 371 (c)(1),
(2) Date: Nov. 17, 2015

(87) PCT Pub. No.: WO2014/204426
PCT Pub. Date: Dec. 24, 2014

(65) Prior Publication Data
US 2016/0145975 A1    May 26, 2016

(51) Int. Cl.
*E21B 41/00* (2006.01)
*H02K 7/18* (2006.01)
(Continued)

(52) U.S. Cl.
CPC .......... *E21B 41/0085* (2013.01); *E21B 21/12* (2013.01); *H02K 7/1823* (2013.01); *H02P 9/04* (2013.01)

(58) Field of Classification Search
CPC ... E21B 21/12; E21B 41/0085; H02K 7/1823; H02P 9/04
See application file for complete search history.

(56) References Cited

U.S. PATENT DOCUMENTS 2,266,355 A * 12/1941 Chun ........................ E21B 4/02
175/4.56
5,839,508 A * 11/1998 Tubel .................. E21B 41/0085
166/65.1
(Continued)

FOREIGN PATENT DOCUMENTS

CN     202850902 U     4/2013
CN     202900173 U     4/2013

OTHER PUBLICATIONS

International Search Report and Written Opinion dated Nov. 14, 2013; PCT International Application No. PCT/US2013/046073.
(Continued)

Primary Examiner — James G Sayre
(74) Attorney, Agent, or Firm — McGuire Woods LLP

(57) ABSTRACT

An apparatus for generating electrical power downhole comprises a housing located in a drillstring. A primary flow channel is formed through the housing. At least two secondary flow channels are located in the housing and are laterally displaced from the primary flow channel, A fluid driven electrical generator is positioned in each of the at least two secondary flow channels. A controllable flow diverter is associated with each of the secondary flow channels to controllably divert at least a portion of a fluid flow m the primary flow channel to at least one of the at least two secondary flow channels to drive the generator therein.

15 Claims, 5 Drawing Sheets

(51) Int. Cl.
*H02P 9/04* (2006.01)
*E21B 21/12* (2006.01)

(56) References Cited

U.S. PATENT DOCUMENTS

| | | | | |
|---|---|---|---|---|
| 2006/0175838 A1* | 8/2006 | Tips | .................... | E21B 41/0085 |
| | | | | 290/1 R |
| 2009/0301784 A1* | 12/2009 | Hall | ........................ | E21B 21/08 |
| | | | | 175/269 |
| 2012/0139250 A1* | 6/2012 | Inman | ..................... | E21B 21/10 |
| | | | | 290/52 |
| 2013/0153242 A1* | 6/2013 | Flight | ................. | E21B 33/0355 |
| | | | | 166/363 |

OTHER PUBLICATIONS

Chinese Office Action dated Mar. 1, 2017; Chinese Patent Application No. 201380075594.6.

\* cited by examiner

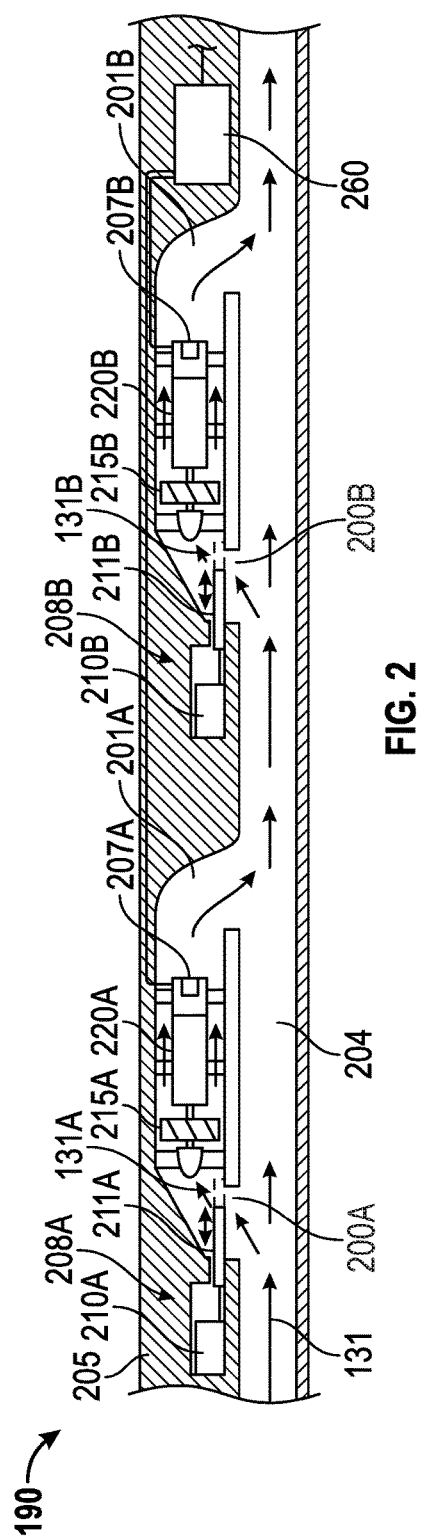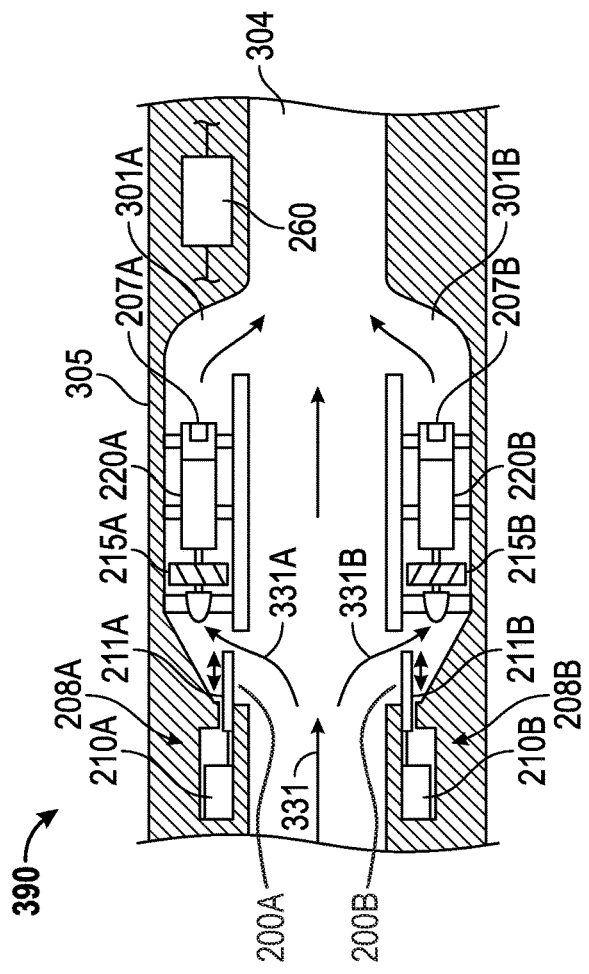

DOWNHOLE POWER GENERATION SYSTEM

BACKGROUND OF THE INVENTION

The present disclosure relates generally to the field of drilling wells and more particularly to downhole power generation.

Electrical power for use in the downhole drilling environment may be supplied by batteries in the downhole equipment, or by downhole fluid driven generators. Downhole batteries may suffer reliability problems at high temperatures. Fluid driven generators may be required to operate over a wide range of flow rates. As the flow rate increases, mechanical loads on the generator components increase, possibly causing mechanical failures. Electrical generators typically continue to generate more power as the rotational rate increases. At high flow rates, this high power output may generate more power than is necessary for the intended application. The excess power generation may lead to excessive heat generation both in the generator, and in the power conversion and conditioning electronics.

BRIEF DESCRIPTION OF THE DRAWINGS

FIG. 2 shows one embodiment of a downhole electrical generator system having, axially spaced generators;

FIG. 3 shows another embodiment of a downhole electrical generator system having peripherally spaced generators;

DETAILED DESCRIPTION

Figure 1:
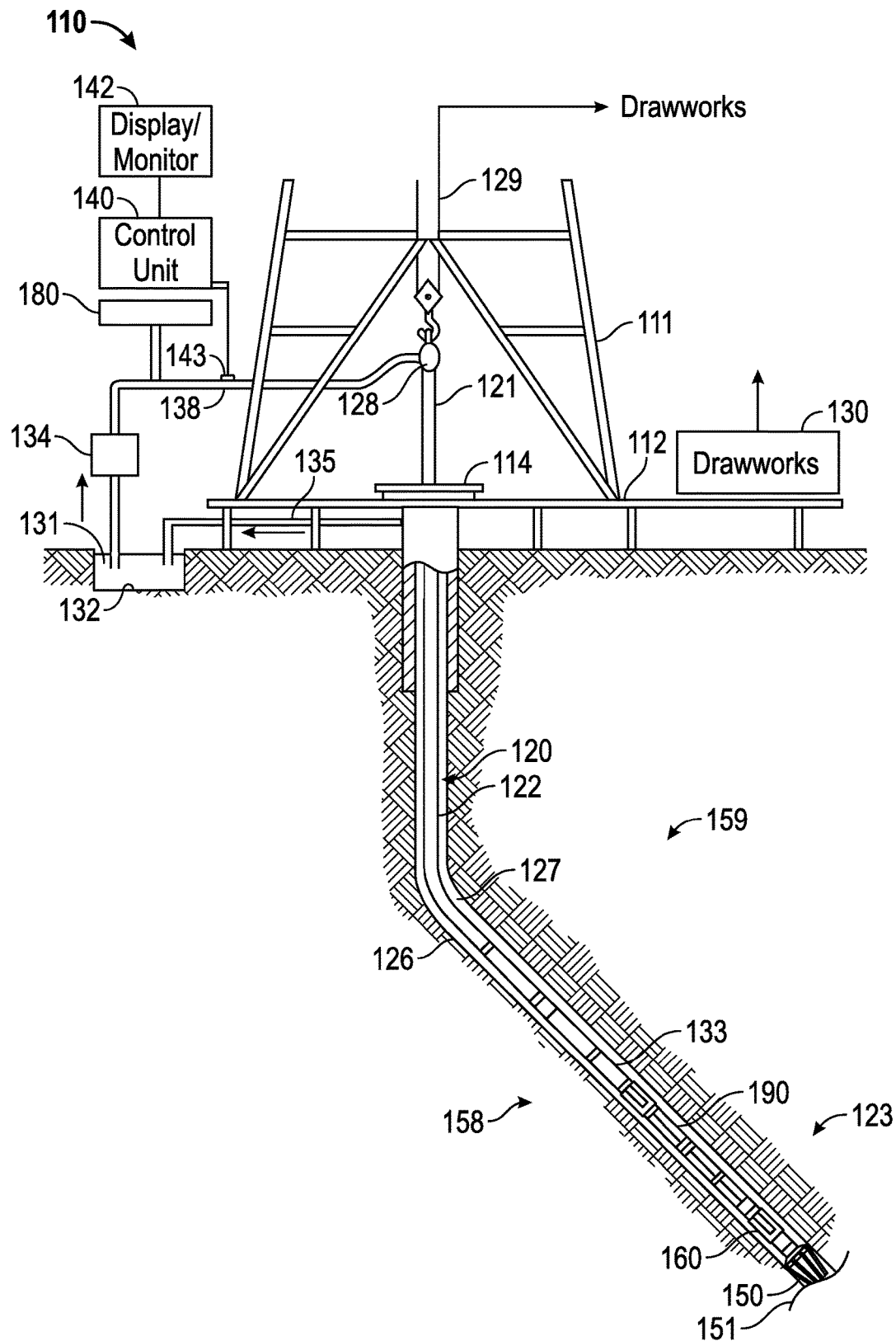
FIG. 1 shows a schematic diagram of a drilling system.

FIG. 1 shows a schematic diagram of a drilling system 110 having a downhole assembly according to one embodiment of the present disclosure. As shown, the system 110 includes a conventional derrick 111 erected on a derrick floor 112, which supports a rotary table 114 that is rotated by a prime mover not shown) at a desired rotational speed. A drill string 120 that comprises a drill pipe section 122 extends downward from rotary table 114 into a directional borehole 126. Borehole 126 may travel in a three-dimensional path. A drill bit 150 is attached to the downhole end of drill string 120 and disintegrates the geological formation 123 when drill bit 150 is rotated. The drill string 120 is coupled to a drawworks 130 via a kelly joint 121, swivel 128 and line 129 through a system of pulleys (not shown). During the drilling operations, drawworks 130 is operated to control the weight on bit 150 and the rate of penetration of drill string 120 into borehole 126. The operation of drawworks 130 is well known in the art and is thus not described in detail herein.

During drilling operations a suitable drilling fluid (also referred to in the art as "mud") 131 from a mud pit 132 is circulated under pressure through drill string 120 by a mud pump 134. Drilling fluid 131 passes from mud pump 134 into drill string 120 via fluid line 138 and kelly joint 121. Drilling fluid 131 is discharged at the borehole bottom 151 through an, opening in drill bit 150. Drilling fluid 131 circulates uphole through the annular space 127 between drill string 120 and borehole 126 and is discharged into mud pit 132 via a return line 135. Preferably, a variety of sensors (not shown) are appropriately deployed on the surface according to known methods in the art to provide information about various drilling-related parameters, such as fluid flow rate, weight on bit, hook load, etc.

In one example embodiment of the present disclosure, a bottom hole assembly (BHA) 159 may comprise a measurement while drilling (MWD) system 158 comprising various sensors to provide information about the formation 123 and downhole drilling parameters. BHA 159 may be coupled between the drill bit 150 and the drill pipe 122.

MWD sensors in BHA 159 may include, but are not limited to, a sensors for measuring the formation resistivity near the drill bit, a gamma ray instrument for measuring the formation gamma ray intensity, attitude sensors for determining the inclination and azimuth of the drill string, and pressure sensors for measuring drilling fluid pressure downhole. The above-noted sensors may transmit data to a downhole telemetry transmitter 133, which in turn transmits the data uphole to the surface control unit 140. In one embodiment a mud pulse telemetry technique may be used to communicate data from downhole sensors and devices during drilling operations. A transducer 143 placed in the mud supply line 138 detects the mud pulses responsive to the data transmitted by the downhole transmitter 133. Transducer 143 generates electrical signals in response to the mud pressure variations and transmits such signals to a surface control unit 140. Surface control unit 140 may receive signals from downhole sensors and devices via sensor 143 placed in fluid line 138, and processes such signals according to programmed instructions stored in a memory, or other data storage unit, in data communication with surface control unit 140. Surface control unit 140 may display desired drilling parameters and other information on a display/monitor 142 which may be used by an operator to control the drilling operations. Surface control unit 140 may contain a computer, a memory for storing data, a data recorder, and other peripherals. Surface control unit 140 may also have drilling, log interpretation, and directional models stored therein and may process data according to programmed instructions, and respond to user commands entered through a suitable input device, such as a keyboard (not shown).

In other embodiments, other telemetry techniques such as electromagnetic and/or acoustic techniques, or any other suitable technique known in the art may be utilized for the purposes of this invention. In one embodiment, hard-wired drill pipe may be used to communicate between the surface and downhole devices. In one example, combinations of the techniques described may be used. In one embodiment, a surface transmitter receiver 180 communicates with downhole tools using any of the transmission techniques described, for example a mud pulse telemetry technique. This may enable two-way communication between surface control unit 140 and the downhole tools described below.

In one embodiment, a downhole electrical generator system 190 may be located in BHA 159 for generating electrical power for use by various downhole tools and/or sensors. Downhole power generation may be problematic for a number of reasons. For example, downhole power generation can be affected by downhole temperature and the drilling shock and vibration environment. Downhole fluid driven electrical generators may be adversely affected by variations in the fluid flow rate that are dictated by the drilling plan and/or changes in the drilling plan. For example, a fluid driven generator system may be sized to produce a given power output at a relatively low flow rate for a given drilling section. A fluid driven generator typically turns faster and puts out more power as flow increases.

Higher flow may impose higher rotational rate resulting in higher loads and wear on the rotating members. In addition, there may be additional frictional heat generated internal to the generator that has a detrimental effect. Further, the additional power may overload associated downhole power control circuitry, causing costly downhole failures.

FIG. 2 shows one embodiment of a downhole electrical generator system 190 according to the present disclosure. The disclosed embodiment comprises at least two fluid driven electrical generators that can be controllably exposed to drilling fluid flow to generate electrical power. Housing 205 may be positioned in BHA 159 in drillstring 120, as shown on FIG. 1. The actual location in any particular drillstring may be dependent on the particular well being drilled and the design of the BHA for that well. In the example shown in FIG. 2, housing 205 has a primary flow channel 204 and two secondary flow channels 201A,B, where the secondary flow channels 201A,B are laterally displaced from the primary flow channel. As shown in FIG. 2, the secondary flow channels 201A,B are axially spaced along the housing 205. It is intended that any number of secondary flow channels may be used. Secondary flow channels 201A,B each have a turbine 215 A,B operatively coupled to a fluid driven electrical generator 220 A,B positioned therein, respectively. As used herein, the term generator is intended to comprise both rotating AC alternators and rotating DC generators, of any design suitable for downhole application. Each fluid driven electrical generator 220 A,B has an operatively attached turbine 215 A,B. Fluid flow through each secondary flow channel 201 A,B causes turbines 215 A,B to rotate thereby causing fluid driven generators 220 A,B to produce electrical power. The amount of power produced increases as the amount of flow through each secondary flow passage 201 A,B increases. Each fluid driven generator 220 A,B may comprise an RPM sensor, 207 A,B, respectively, for detecting the RPM of the respective generator.

In the example shown, each secondary flow channel 201 A,B has a controllable flow diverter assembly 208 A,B associated therewith. Each controllable flow diverter assembly 208 A,B may be individually actuated to controllably divert at least a portion 131 A,B of fluid flow 131 through secondary channels 201 A,B respectively, to cause a related amount of power to be generated by each fluid driven generator 220 A,B. As shown, controllable flow diverter assemblies 208 A,B may each comprise a gate 211 A,B that may be controllably positioned in opening 200 A,B between primary flow channel 204 and each secondary flow channel 201 A,B, by a controllable actuator 210 A,B. Controllable actuators 210 A,B are each operably coupled to a downhole controller 260, described below. Controllable actuators 210 A, B may comprise an electrical actuator, for example a solenoid or a linear motor. Alternatively, a hydraulic piston may be used. In one example each controllable actuator 210 A,B may be independently actuated to allow fluid flows 131A,B in the respective secondary flow channels, 201 A,B. In one example, fluid flow may be allowed through one of the secondary flow channels 201A,B, with the other secondary flow channel closed to through flow. The "A" generator may be considered a primary generator and the "B" generator may be considered a backup. If the "A" generator exhibits reduced output, or other failure, the "B" generator may be used to extend the drilling time without removing the drillstring from the wellbore. In another example, fluid flow 131 A,B may be simultaneously diverted through the respective secondary flow channels to provide for an increased downhole fluid flow rate. Flow through the flow channels may be controlled according to programmed instructions in controller 260, described below.

In another embodiment, see FIG. 3, a downhole electrical generator system 390 comprises secondary flow channels 331A, 331B that are laterally displaced and peripherally positioned around primary flow channel 331 in housing 305. Each flow channel has an electrical generator 220A,B disposed therein. Other components shown in FIG. 3 are similar to those described with respect to FIG. 2. While shown having two secondary flow channels, any number of secondary flow channels may be positioned around primary flow channel 331, based on the particular size constraints of the system. One skilled in the art will appreciate that the actual design constraints of size and number of generators may be driven by the actual borehole and drill string size, which may be location dependent. Such designs are considered well within the capability of someone skilled in the art. The present application is intended to cover all such designs as claimed below.

Figure 4A:
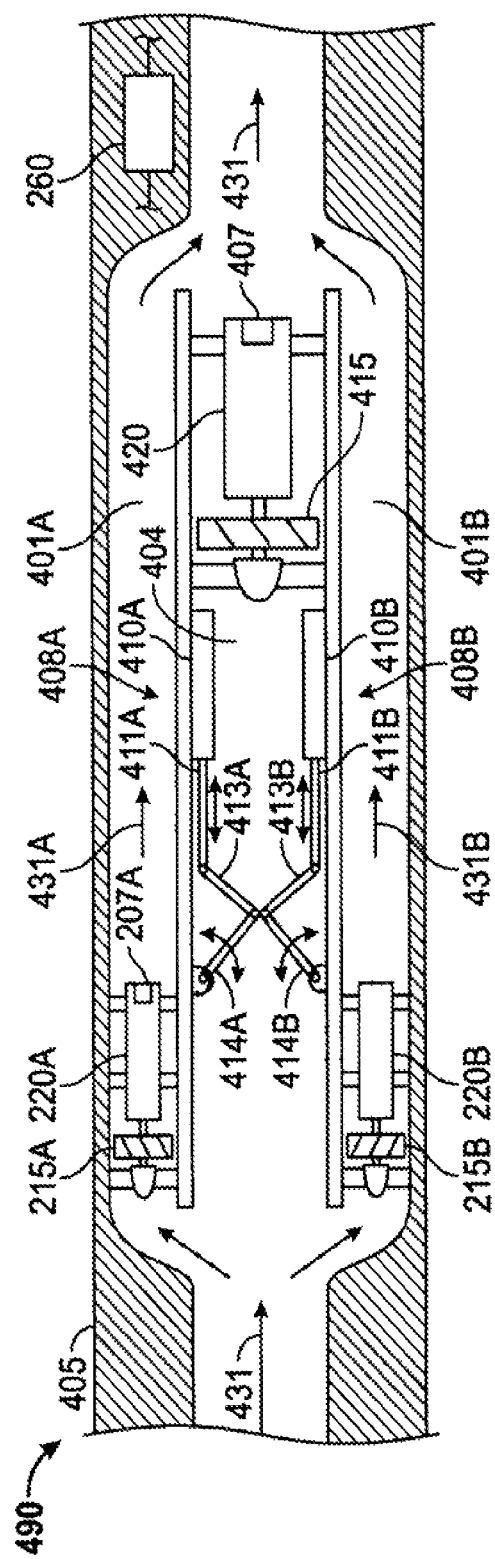
FIG. 4 shows another embodiment of a downhole generator system with a centralized flow diverter.
Figure 4B:
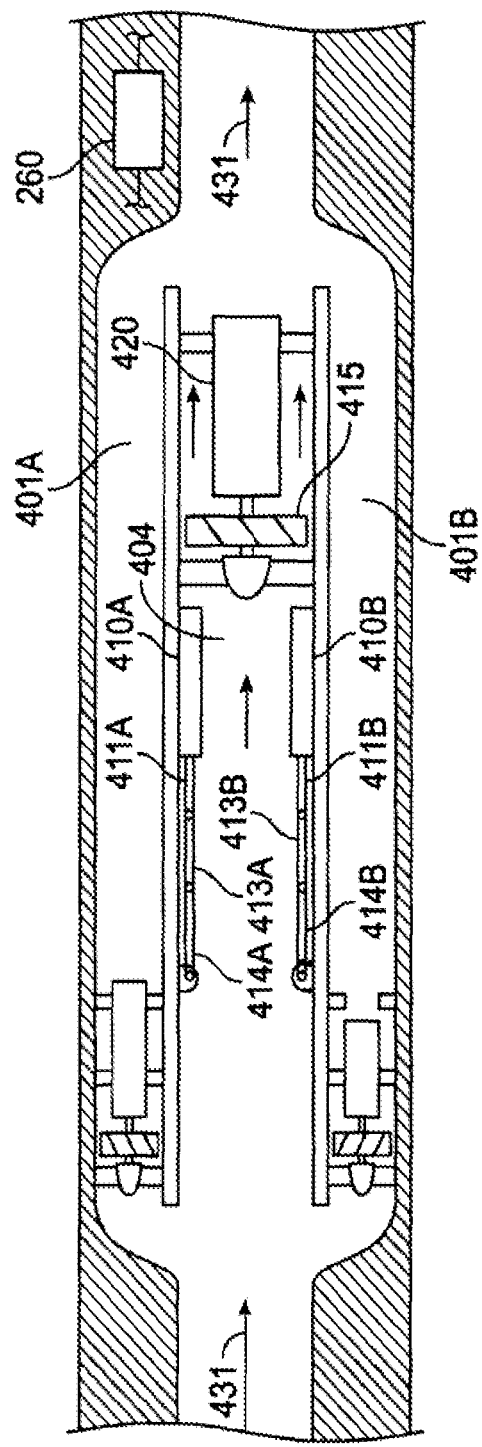

In yet another embodiment, see FIGS. 4A, 4B, a downhole electrical generator system 490 comprises secondary flow channels 401A, 401B that are laterally displaced and peripherally positioned around primary flow channel 404 in housing 405, in this embodiment, each secondary flow channel has a fluid driven electrical generator 220A, B positioned therein. In addition, primary flow channel 404 has a fluid driven electrical generator 420 (including a turbine 415) positioned therein. Fluid driven generator 420 may have larger flow capacity as compared to that of fluid driven generators 220 A,B.

Flow channel 404 has at least two pivotable segments 414 A,B positioned around the internal periphery of primary flow passage 404. Pivotable segments 414 A,B may be controllably actuated by actuator assemblies 408 A,B to pivot inwards to constrict fluid flow in primary flow channel 404. The constriction diverts flow through secondary flow channels 401A,B. The amount of constriction is controllable. When the primary flow channel is constricted, fluid flow portions 431 A,B cause generators 220 A,B to generate electrical power. The amount of power generated by generators 220 A,B may be controlled by controlling, the amount of constriction of primary flow channel 404. The amount of constriction is regulated by actuator assemblies 408 A,B comprising actuators 410 A,B, and linkage members 413 A,B. Actuators 410 A,B each have a linearly extendable shaft 411 A,B, respectively. Controllable actuators 410A,B may comprise an electrical actuator, for example a solenoid or a linear motor. Alternatively, a hydraulic piston may be used. Linkage members 413 A,B are coupled between actuator shaft 411 A,B and pivotable segments 414 A,B respectively. Linear motion of actuator shafts 411 A,B causes the pivotable segments 414 A,B to pivot into primary flow channel 404 to constrict primary flow 431. In one example, actuators 410 A,B are operatively coupled to controller 260 by electrical and/or optical couplers (not shown) run thorough wiring passages in housing 405. Such wiring techniques are known on the art and are not described here in detail. In operation, flow may be diverted to secondary flow channels 401 A,B for power generation at low flow rates. At higher flow rates, the diverter may be opened allowing fluid to flow through primary flow channel.

Flow through the flow channels of the various example embodiments may be controlled by downhole controller 260. In one example, controller 260 acts according to programmed instructions to detect at least one parameter of interest of each of the generators and to actuate each of the flow diverters based on the at least one parameter of interest.

Figure 5:
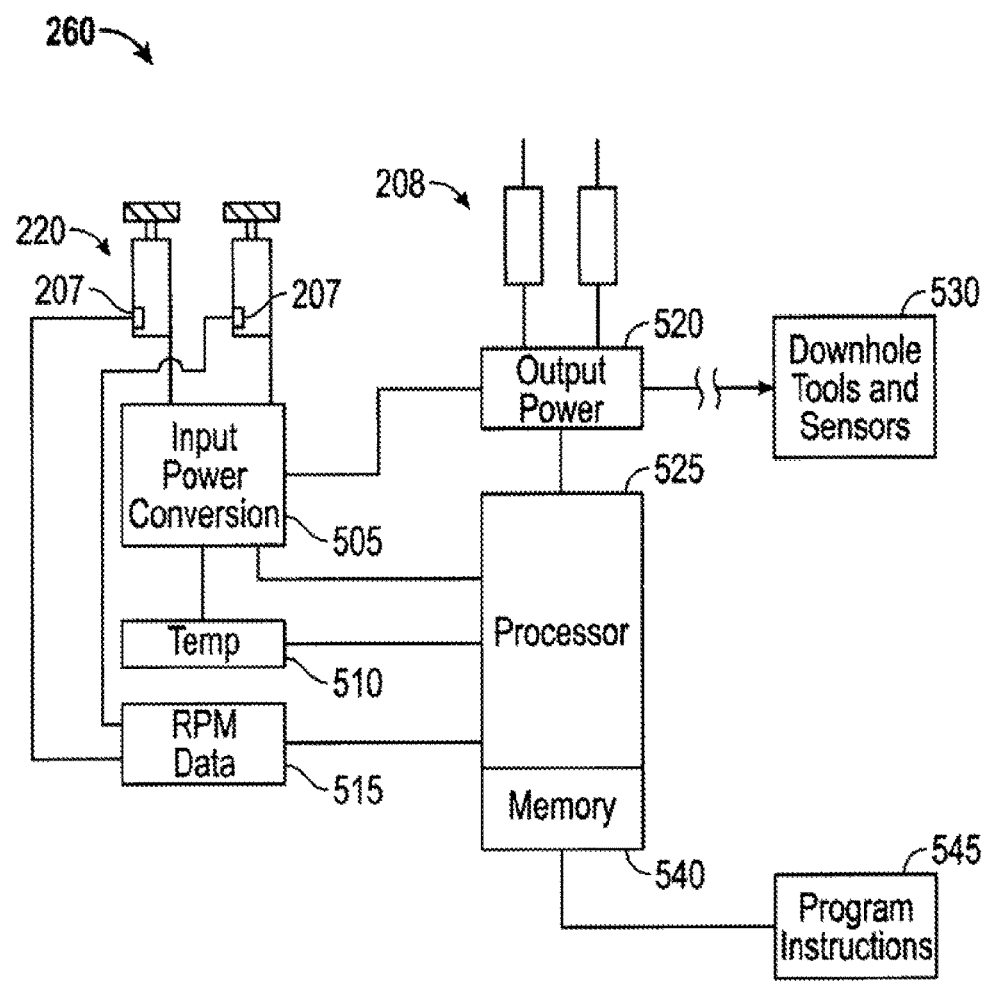
FIG. 5 shows a block diagram of one embodiment of a downhole generator system.

FIG. 5 shows a block diagram of controller 260 in relation to embodiments shown in FIGS. 2 and 3. Power from fluid driven generators 220 A,B is input to input power conversion circuits 505 for conditioning into suitable voltage ranges and power distribution for use by various downhole components. Such circuits may monitor the voltage from generators 220 A,B. Generators 220 A,B may also include an RPM sensor 207. In addition, input power conversions circuits 505 may contain one, or more, temperature sensors 510 to monitor the temperature of the various voltage conversion components. Input power conversion circuits 505 are operably coupled to processor 525. In addition, temperature data from temperature sensor 510 and RPM data 515 are transmitted to processor 525. Processor 525 may be any processor suitable for downhole use. Processor 525 is in data communication with memory 540. Any memory suitable for downhole use may be used. Processor 525 may act according to suitable program instructions 545 stored in memory 540 to monitor the power output from generators 220 A,B, to monitor at least one parameter of interest, and to controllably actuate the flow diverter assemblies to control the flow through the appropriate flow passages based on the at least one parameter of interest. Suitable parameters of interest include, but are not limited to: generator output voltage, electronic component temperatures, and generator rpm. In addition, processor 525 may apportion power through output power circuits 520 to downhole tools and sensors 530.

The invention claimed is:

1. An apparatus for generating electrical power downhole comprising:
   a housing located in a drillstring;
   a primary flow channel through the housing;
   at least two secondary flow channels in the housing, the at least two secondary flow channels laterally displaced from the primary flow channel;
   a first fluid driven electrical generator positioned within the primary flow channel;
   at least one second fluid driven electrical generator positioned in each of the at least two secondary flow channels; and
   at least one controllable flow diverter associated with each of the secondary flow channels, the at least one controllable flow diverter being operable to controllably apportion a fluid flow to the primary flow channel and to at least one of the at least two secondary flow channels to drive the generator therein.

2. The apparatus of claim 1 further comprising a controller operably coupled to each of the fluid driven generators and to each controllable flow diverter wherein the controller acts according to programmed instructions to detect at least one parameter of interest of each of the generators and to actuate each of the flow diverters based on the at least one parameter of interest.

3. The apparatus of claim 2 wherein the at least one parameter of interest is chosen from the group consisting of: generator output voltage and generator rotational speed.

4. The apparatus of claim 1 wherein the at least two secondary flow channels are positioned axially spaced apart along the housing.

5. The apparatus of claim 1 wherein the at least two secondary flow channels are spaced apart circumferentially around the primary flow channel.

6. The apparatus of claim 1 wherein the drillstring comprises wired drill pipe.

7. A method of generating electrical energy downhole comprising;
   positioning a housing located in a drillstring;
   forming a primary flow channel through the housing;
   forming at least two secondary flow channels in the housing, the at least two secondary flow channels laterally displaced from the primary flow channel;
   positioning a first fluid driven electrical generator positioned within the primary flow channel;
   positioning at least one second fluid driven electrical generator in each of the at least two secondary flow channels; and
   using at least one controllable flow diverter to controllably apportion fluid flow to the primary flow channel and to at least one of the at least two secondary flow channels to drive the second fluid driven electrical generator therein.

8. The method of claim 7 further comprising operably coupling a controller to each of the fluid driven generators and to each controllable flow diverter; detecting at least one parameter of interest of each of the generators; and controllably actuating each of the flow diverters based on the least one parameter of interest.

9. The method of claim 8 wherein the at least one parameter of interest is chosen from the group consisting of: generator output voltage and generator rotational speed.

10. The method of claim 7 further comprising positioning the at least two secondary flow channels axially spaced apart along the housing.

11. The method of claim 7 further comprising positioning the at least two secondary flow channels spaced apart circumferentially around the primary flow channel.

12. The method of claim 7 wherein the drillstring comprises wired drill pipe.

13. An apparatus for generating electrical power downhole comprising:
   a housing located in a drillstring;
   a primary flow channel through the housing;
   at least one secondary flow channels in the housing, the at least one secondary flow channel laterally displaced from the primary flow channel;
   a first fluid driven electrical generator positioned in the primary flow channel;
   at least one second fluid driven electrical generator positioned in the at least one secondary flow channel; and
   a controllable flow diverter to controllably apportion the fluid flow to the primary flow channel and the at least one secondary flow channel to drive the generators therein.

14. The apparatus of claim 13 further comprising a controller operably coupled to each of the fluid driven generators and to the controllable flow diverter wherein the controller acts according to programmed instructions to detect at least one parameter of interest of each of the generators and to actuate the flow diverter based on the at least one parameter of interest.

15. The apparatus of claim 14 wherein the at least one parameter of interest is chosen from the group consisting of: generator output voltage and generator rotational speed.

* * * * *